(12) United States Patent
Cambou (10) Patent No.: US 11,101,988 B2
(45) Date of Patent: Aug. 24, 2021

(54) QUANTUM TERNARY KEY DISTRIBUTION

(71) Applicant: Arizona Board of Regents on Behalf of Northern Arizona University, Flagstaff, AZ (US)

(72) Inventor: Bertrand F Cambou, Flagstaff, AZ (US)

(73) Assignee: Arizona Board of Regents on Behalf of Northern Arizona University, Flagstaff, AZ (US)

( * ) Notice: Subject to any disclaimer, the term of this patent is extended or adjusted under 35 U.S.C. 154(b) by 0 days.

(21) Appl. No.: 16/883,496

(22) Filed: May 26, 2020

(65) Prior Publication Data

US 2020/0382293 A1 Dec. 3, 2020

Related U.S. Application Data

(60) Provisional application No. 62/854,260, filed on May 29, 2019.

(51) Int. Cl.
| | |
|---|---|
| *H04L 9/08* | (2006.01) |
| *H04L 29/06* | (2006.01) |
| *H04B 10/079* | (2013.01) |
| *H04L 9/32* | (2006.01) |

(52) U.S. Cl.
CPC ....... *H04L 9/0858* (2013.01); *H04B 10/0795* (2013.01); *H04L 9/0866* (2013.01); *H04L 9/3236* (2013.01); *H04L 9/3278* (2013.01); *H04L 63/0435* (2013.01)

(58) Field of Classification Search
CPC ....... H04L 9/0858; H04L 9/08; H04L 9/3271; H04L 63/062; H04B 10/0795
USPC ................ 380/277, 278, 279, 283
See application file for complete search history.

(56) References Cited

U.S. PATENT DOCUMENTS

| | | | | |
|---|---|---|---|---|
| 2014/0226813 A1* | 8/2014 | Heffner | ................ | H04L 9/0866 380/44 |
| 2019/0280858 A1* | 9/2019 | Cambou | ............... | H04L 9/0866 |
| 2019/0305942 A1* | 10/2019 | Cambou | ............... | H04L 9/3271 |

* cited by examiner

*Primary Examiner* — Izunna Okeke
(74) *Attorney, Agent, or Firm* — Quarles & Brady LLP (57) ABSTRACT

A transmitting device and a receiving device independently generate shared encryption keys by exchanging a ternary datastream composed of trits encoded by polarized photons generated and measured using one of two polarization orientations. The first orientation defines two mutually-orthogonal polarization axes and a mixed polarization state formed by a combination of the two axes for that orientation. The second orientation also define two mutually-orthogonal polarization axes and a mixed polarization state formed by a combination of the two axes for that orientation. The mutually-orthogonal axes of one orientation are combinations of the mutually-orthogonal axes of the other orientation. The sender and receiver independently choose an orientation for each trit and use trits where each party's polarization orientations agree to determine addresses in separate cryptographic tables belonging to each party. Information retrieved or generated using data in the cryptographic tables is used by both parties to independently generate the same encryption key.

20 Claims, 6 Drawing Sheets

```
┌─────────────────────────────────────────────────────────────────────┐
│  RECEIVE A FIRST PORTION OF A TERNARY DATASTREAM VIA AN OPTICAL      │
│  COMMUNICATIONS INTERFACE BY MEASURING PHOTONS REPRESENTING TRITS    │
│  WITH RESPECT TO A FIRST POLARIZATION ORIENTATION.                   │
│                                                                  702 │
└─────────────────────────────────────────────────────────────────────┘
                                    │
┌─────────────────────────────────────────────────────────────────────┐
│  RECEIVE A SECOND PORTION OF THE TERNARY DATASTREAM VIA THE OPTICAL  │
│  COMMUNICATIONS INTERFACE BY MEASURING PHOTONS REPRESENTING TRITS    │
│  WITH RESPECT TO A SECOND POLARIZATION ORIENTATION.                  │
│                                                                  704 │
└─────────────────────────────────────────────────────────────────────┘
                                    │
┌─────────────────────────────────────────────────────────────────────┐
│    GENERATE TERNARY VALUES FOR THE RECEIVED PHOTONS REPRESENTING     │
│       EACH TRIT BASED ON A NUMBER OF RECEIVED PHOTONS FOR THAT TRIT. │
│                                                                  706 │
└─────────────────────────────────────────────────────────────────────┘
                                    │
┌─────────────────────────────────────────────────────────────────────┐
│   RECEIVE INFORMATION FROM A SERVER INDICATING A SET OF SUCCESSFULLY-│
│               RECEIVED TRITS FROM THE TERNARY DATASTREAM.            │
│                                                                  708 │
└─────────────────────────────────────────────────────────────────────┘
                                    │
┌─────────────────────────────────────────────────────────────────────┐
│   DETERMINE ADDRESSEES IN THE ADDRESSABLE CRYPTOGRAPHIC TABLE USING  │
│              THE SET OF SUCCESSFULLY-RECEIVED TRITS.                 │
│                                                                  710 │
└─────────────────────────────────────────────────────────────────────┘
                                    │
┌─────────────────────────────────────────────────────────────────────┐
│   GENERATE AN ENCRYPTION KEY USING DATA RETRIEVED FROM ADDRESSES IN  │
│              AN ADDRESSABLE CRYPTOGRAPHIC TABLE.                     │
│                                                                  712 │
└─────────────────────────────────────────────────────────────────────┘
                                    │
┌─────────────────────────────────────────────────────────────────────┐
│   USE THE ENCRYPTION KEY TO EXCHANGE MESSAGES ENCRYPTED WITH THE     │
│              ENCRYPTION KEY WITH THE SERVER.                         │
│                                                                  714 │
└─────────────────────────────────────────────────────────────────────┘
```

*FIG. 7*

QUANTUM TERNARY KEY DISTRIBUTION

CROSS-REFERENCE TO RELATED APPLICATIONS

The present application claims priority to U.S. Provisional Application 62/854,260 entitled "Quantum Ternary Key Distribution" and filed on May 29, 2019.

BACKGROUND OF THE INVENTION

Conventional secure communication techniques involve transmitting encrypted information over a channel such as an electrical transmission line, a fiber-optic cable, or through free space using electromagnetic waves. Such techniques make use of cryptographic methods utilizing shared secrets (i.e., a cryptographic key) between a sender and a receiver to ensure that only the intended parties can properly encode and decode a message. However, these techniques are vulnerable to eavesdropping which may lead to the content of the communication being compromised. Advanced techniques use quantum cryptographic methods which include quantum key distribution (QKD) protocols to enhance security. Quantum cryptography takes advantage of consequences of the Heisenberg uncertainty principle, namely that measurement of a quantum state necessarily disturbs that state. In practice this means that any eavesdropper to a communication over a properly implemented quantum channel will disturb the communication, revealing the presence of the eavesdropper. A shared encryption key may be generated and transmitted over a potentially insecure quantum channel, followed by verification that the key was not intercepted.

Many QKD protocols are based on the use of two random number generators. The first random number generator determines which of two possible sets of basis states (denoted by "x" and "+") will be used by the sender to emit each of a stream of qubits over an optical quantum channel. The second random number generator is used to select one of the two possible bases as a measurement basis for the incoming stream of qubits. After transmission, both communicating parties, in an example referred to as "Alice" and "Bob," share the respective sequence of bases they used to select a portion of the stream transmitted and received with the same bases (i.e., x/x or +/+) and use this portion to construct a shared key. Under normal conditions, the expectation is that such a portion of the stream should contain a very small number of errors. The portion of the stream transmitted with misaligned bases, (i.e., either x/+ or +/x, contains many errors and is ignored. However, when eavesdropping of the stream of qubits has occurred, the error rate will be much higher than expected. In order to determine whether eavesdropping has taken place, the error rate must be measured by the sender and receiver by exchanging partial information about the key over an unsecured channel. If the number of errors is small, the communicating parties assume that the key distribution was secure.

BRIEF SUMMARY

In an embodiment, a system comprises a server and client device. The server has a server processor including ternary circuitry configured to generate and receive ternary signals and perform ternary logic operations on the ternary signals; a first optical communication interface coupled to the server processor and having a polarization control device and configured to couple to an optical communication channel; and first memory storing an addressable cryptographic table storing ternary strings and executable first instructions.

The first instructions, when executed by the server processor cause the server to generate a ternary datastream using the ternary circuitry and transmit a first portion of the ternary datastream via the optical communication interface of the server using a first polarization orientation by generating polarized photons according to ternary digits ("trit") of the first portion of ternary datastream The first polarization orientation defines first and second polarization axes that are mutually orthogonal to each other. The polarized photons for each trit are polarized: along the first polarization axis when that trit has a first ternary value; along the second polarization axis when that trit has a second ternary value; and along a third polarization axis that is an equally-weighted vector combination of the first and second polarization axes when that trit has a third ternary value.

The first instructions, when executed by the server processor further cause the server to transmit a second portion of the ternary datastream using a second polarization orientation by generating polarized photons representing trits of the second portion of the ternary datastream. The second polarization orientation defines fourth and fifth polarization axes that are mutually orthogonal to each other. The polarized photons for each trit of the second portion of the ternary datastream are polarized along one of the following polarization axes according to a ternary value of that trit: the fourth polarization axis, the fifth polarization axis, and a sixth polarization axis. The fourth and fifth polarization axes are equally-weighted vector combinations of the first and second polarization axes. The sixth polarization axis is an equally-weighted vector combination of the fourth and fifth polarization axes and also parallel to one of the first and second polarization axis.

The first instructions, when executed by the server processor further cause the server to select successfully-received trits from the ternary datastream according to selection instructions stored in the memory; determine addresses in the addressable cryptographic table of the server using the selected successfully-received trits; generate an encryption key using data retrieved from the addresses in the addressable cryptographic table of the server; and use the encryption key to encrypt and decrypt communications between the server device and the receiving device.

The client device has a client processor including client ternary circuitry configured to generate and receive ternary signals and perform ternary logic operations on ternary signals; a second optical communication interface having a polarization control device coupled to the client processor and configured to couple to the optical communication channel; an addressable cryptographic table configured to produce ternary strings when queried and second memory storing second executable instructions.

The second instructions, when executed by the client processor, cause the client device to receive a third portion of the ternary datastream by measuring photons received via the optical communication interface of the client device with respect to the first polarization orientation; receive a fourth portion of the ternary datastream by measuring photons received via the optical communication interface of the client device with respect to the second polarization orientation; and assign ternary values for the \received photons for each trit. Each trit is assigned the first ternary value when the number of received photons is larger than a first number of photons; the second ternary value when the number of received photons is smaller than a second number of photons; and the third ternary value when the number of received photons is less than the first number of photons and greater than the second number of photons.

The second instructions, when executed by the client processor, further cause the client device to transmit the reception information to the server; select successfully-received trits from the ternary datastream according to selection instructions received from the server; determine addresses in the addressable cryptographic table of the client device using the selected successfully-received trits; generate the encryption key using data retrieved from the addresses in the addressable cryptographic table; and use the encryption key to encrypt and decrypt communications between the client device and the server.

In another embodiment, a system, comprises a processor including ternary circuitry configured to generate and receive ternary signals and perform ternary logic operations on ternary signals; an optical communication interface coupled to the processor having a polarization control device; an addressable cryptographic table configured to produce ternary strings when addresses of the cryptographic table are queried; and memory. The optical communication interface is configured to couple to an optical communication channel and the polarization control device is configurable to measure received photons in one of two polarization orientations: a first polarization orientation that defines first and second polarization axes that are mutually orthogonal to each other; and a second polarization orientation that defines third and fourth polarization axes that are mutually orthogonal to each other, the third and fourth polarization axes each an being equally-weighted vector combination of the first and second polarization axes.

The memory stores executable instructions that, when executed by the processor, cause the system to receive a first portion of a ternary datastream by measuring photons received via the optical communication interface with respect to the first polarization orientation; receive a second portion of the ternary datastream by measuring photons received via the optical communication interface with respect to the second polarization orientation; and assign ternary values for the received photons for each trit. Each trit is assigned the first ternary value when the number of received photons is larger than a first number of photons; a second ternary value when the number of received photons is smaller than a second number of photons; and a third ternary value when the number of received photons is less than the first number of photons and greater than the second number of photons.

The instructions, when executed by the processor, further cause the system to receive information from a server indicating a set of successfully-received trits from the ternary datastream determine addressees in the addressable cryptographic table using the set of successfully-received trits; generate an encryption key using data retrieved from the addresses in the addressable cryptographic table; and use the encryption key to exchange messages encrypted with the encryption key with the server.

The above features and advantages of the present invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

Conventional quantum key distribution approaches have disadvantages. In particular, in approaches where more than one photon is required to reliably transmit one bit of information, an attacker may be able to discern whether they have correctly measured an intercepted signal by counting photons. This may also enable man-in-the-middle attacks, Accordingly, the present disclosure may use a ternary cryptographic approach as well as other measures, such as keys based on physical unclonable functions (PUFs) to address shortcomings of conventional secure communication methods using quantum channels and improve performance, as will be described below. Rather than use information shared between the two parties via QKD (the "public key") as an encryption key, the two parties may use instead use this public key to derive a private key using additional information available only to the two parties which is never transmitted, thus reducing the risk of a successful man-in-the-middle attack.

An exemplary shortcoming of conventional quantum communication protocols is that they require the sender and receiver to exchange information in order to check for errors which would indicate the presence of an eavesdropper. If the parties use a conventional QKD protocol, this exchange exposes part of the string used to agree upon a cryptographic key, requiring the key to be longer than otherwise required. In addition, this information exchange introduces overhead which limits the practical communications bandwidth of the channel. In addition, while quantum communication methods are assumed to be safe against simple eavesdropping, they are not safe against man-in-the-middle attacks which can occur during the QKD process.

The combination of quantum communication channels (or classical channels which share important characteristics of quantum channels that similarly allow with ternary cryptography and addressable PUFs allows the design of communication protocols which have the potential to strengthen existing key distribution protocols or improve communications over quantum channels by replacing conventional QKD protocols.

Addressable PUF generators are excellent candidates to design shared key schemes between transmitting parties that are tamper-resistant and very low power. Keys generated in this manner can be used to augment QKD protocols, adding additional security to quantum communication methods. Each of the options has advantages and varies in performances in terms of data rate and in their ability to sense eavesdropping. In some cases, there is a tradeoff between the data rate of transmission and sensitivity to eavesdropping.

Figure 1:
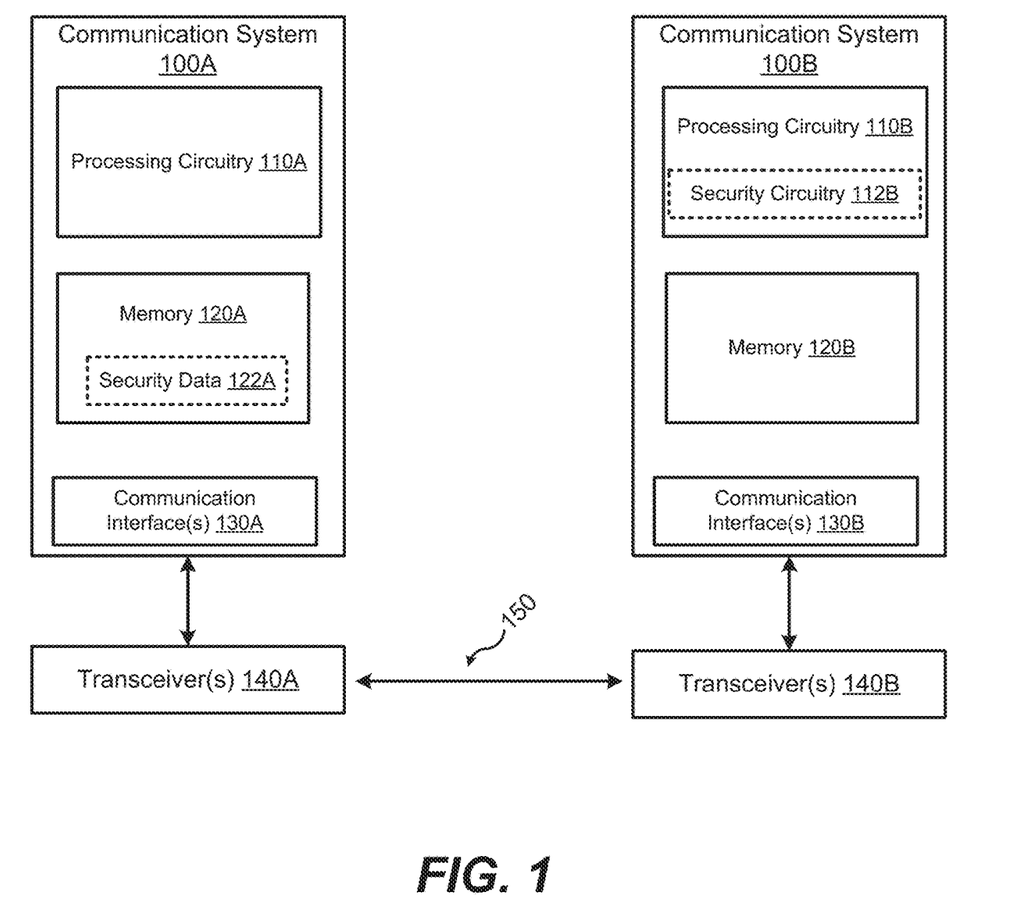
FIG. 1 depicts a schematic of example communication systems in which embodiments disclosed herein may be practiced.

FIG. 1 is a schematic illustrating communications systems in which embodiments disclosed herein may be practiced. In this example, communication system 100A acts as the sender ("Alice") and communication system 100B acts the receiver ("Bob"). The communication systems 100A/B each have respective processing circuitry 110A/B, memory 120A/B, communication interfaces 130A/B, and transceivers 140A/B. Each system communicates sends and/or receives information via its communication interface 140A/B. The communication interfaces 130A/B are coupled to transceivers 140A/B which send signals over a communication channel 150. The processing circuitry 110B of communication system 100B may optionally include security circuitry 112B, for use with certain embodiments disclosed herein. Similarly, the memory 120A of communication system 100A may optionally store security data 122A for use with certain embodiments.

In embodiments of the communication system 100B having the security circuitry 112B, the security circuitry 112B may include a dedicated PUF array. In such embodiments, the processing circuitry 110B may be configured to respond to an authentication challenge which specifies an address (or range of addresses) in the PUF array and a set of operations to perform in order to generate a unique response to the authentication challenge. Such embodiments may be designed to communicate with embodiments of communication system 100A configured to store security data 122A in the memory 120A. In such embodiments, the processing circuitry 110A is configured to generate authentication challenges and receive responses to those challenges. The responses and challenges may be saved as part of the security data 122A. In such embodiments the processing circuitry 110A may be further configured to send randomly-selected challenges to embodiments of communication system 100B having security circuitry 112B. In certain embodiments described herein, transmitting the challenges to communication system 100B allows communication systems 100A and 100B to agree upon the challenge responses as shared encryption keys without required information which might compromise the secrecy of those keys to be transmitted, as described below.

Figure 2:
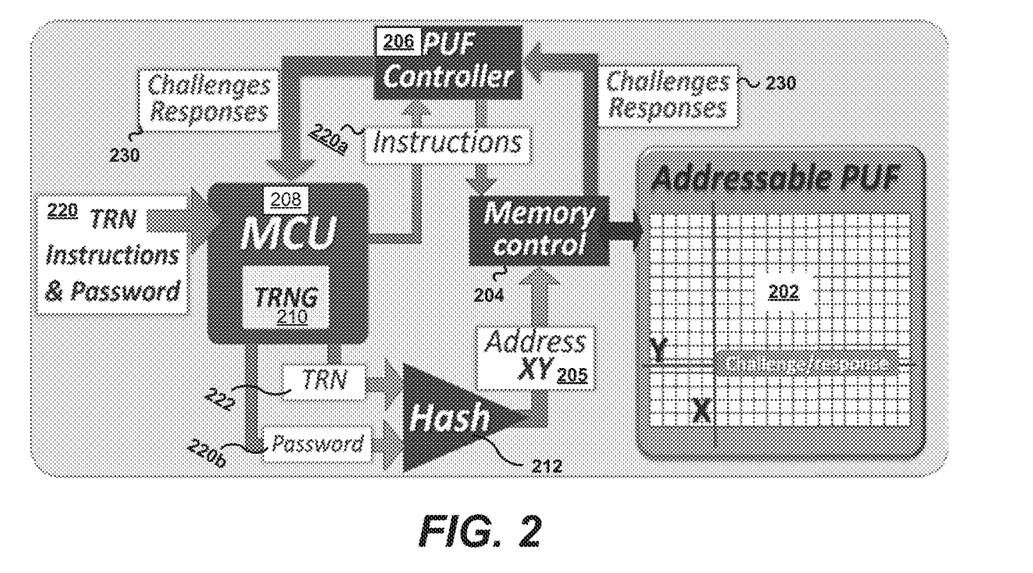
FIG. 2 depicts an addressable physical unclonable function generator useable as a cryptographic table in embodiments disclosed herein.

FIG. 2 illustrates an architecture used in an example embodiment for securely sharing a key using an addressable PUF array 202 and multifactor authentication. The PUF array 202 (shown here as a 2D-array of cells) can be addressed using a memory controller 204, which receives a specified address 205. The memory controller 204 is configured to return characteristics of the PUF array 202 at the address 205, as a response 230. The responses 230 may be specific characteristic of queried cells (or ranges of cells), or may be derived from those characteristics. Non-limiting examples of such characteristics are time delays of transistor-based ring oscillators and transistor threshold voltages. Other non-limiting examples include optical devices. For example, Bob may possess an optical PUF device which, when illuminated by a light source such as a laser produces a unique image. This image may be digitized and the pixels may be used to form an addressable PUF array.

In this example Bob possesses a PUF such as PUF array 202. Upon activation, Bob needs to securely exchange with Alice (or another party from which Alice can securely retrieve information), the measurements of physical elements describing the PUF (or information derived from those measurements). This can be a set of parameters, P, produced by measuring each cell of the PUF array 202. A request to measure the parameters and/or perform further mathematical operations on those parameters may be variously referred to as "challenges." The initial measurements of the PUF, may be various referred to as "challenge responses," or simply "responses." Using this terminology, Alice (or another party) generates a set of challenges during an enrollment process and issues to challenges to Bob (or a party in possession of Bob's PUF at the time of the initialization). The responses obtained to the initial challenges are stored for reference by Alice. When Alice subsequently sends Bob a challenge, Bob can independently re-measure the parameter(s) P at the specific locations of his PUF array to generate appropriate challenge responses. Challenges and the corresponding challenge responses represent a fingerprint of the PUF. With quality PUFs, the Hamming distance between challenges and responses is small.

As shown in FIG. 2, the challenges may be generated by supplying a message 220 (which includes instructions 220a and a password 220b) to a microcontroller 208. The microcontroller 208 may contains a random number generator such as the true-random-number generator (TRNG) 210 forms part of the instructions 220a, which specify how to generate the challenge responses 230 to the memory controller 204. Alternatively, the random number or other instruction may be received from another party. The memory controller 204 receives the instructions 220a and the desired address 205 to query. The desired address 205 is generated by a hash function 212 which hashes the combined password 220b and random number 222 to yield the address 205. Using the instructions 220a and the address 205, the memory controller 204 retrieves the appropriate challenge response 230 and delivers it to the memory controller 204, which delivers the appropriate challenge response 230 to the microcontroller 208. In this example, all possible challenges are issued in advance and the challenge responses 230 are stored by the microcontroller 208 in a lookup table prior to Alice and Bob communicating using the protocols described earlier. In certain preferred embodiments, the PUF array 202, and memory controller 204 are possessed by the receiver (Bob) while the microcontroller 208 is possessed by the transmitting party (Alice).

The random number and instructions identify the challenge and PUF elements to use to generate response. Alice already knows the challenge response because she has stored the response of Bob's PUF generated during the initialization process. Bob re-measures his PUF and re-generates the challenge response. The challenge response can therefore be used as a shared key in the protocol without requiring the key to be exchanged between Alice and Bob during the communication session.

Low power PUFs need only one femtojoule (fJ) to read a response which is below the noise level of any side channel attack. Therefore, a third party cannot know which random number is associated with a portion of the array. Challenge-response-pair (CRP) error rates after error correction below 0.1% are sufficient to implement the protocols described above.

Figure 3:
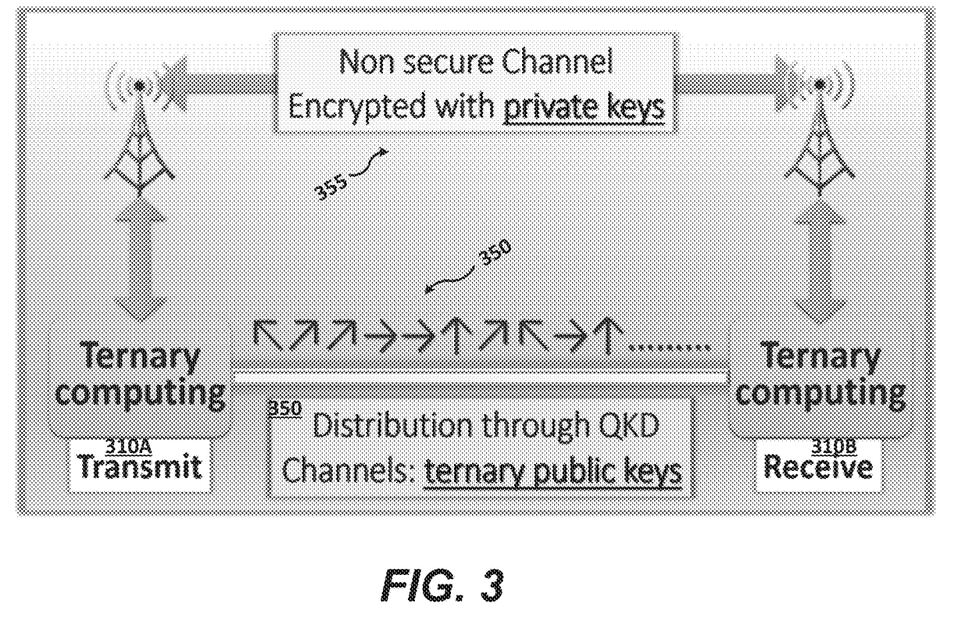
FIG. 3 depicts an environment in which two communication systems share an encryption key using quantum key distribution.

FIG. 3 illustrates a quantum key distribution system in which two parties 310A,B (again, "Alice" and "Bob") can communicate over a quantum channel 350 (in this example, an optical channel that preservers photon polarizations) and an insecure channel 355 which may be any other suitable channel including but not limiting to an optical channel, a wired electrical channel, or a wireless channel. Communications between Alice and Bob may be encrypted using a key shared via a quantum key distribution protocol such as BB84 (described further below in connection with FIG. 5A) which is resistant to eavesdropping. In a modification of such protocols, the key distributed may be used as an instruction that enables Alice and Bob to derive a separate encryption key. For example, Alice and Bob may share a cryptographic table and the instruction may enabled Alice and Bob to access or independent generate the same key using that table. As a further example, this "cryptographic table" functionality may be realized by systems in which Bob has a device that includes an addressable PUF generator such that the one described in connection to FIG. 2.

Figure 4A:
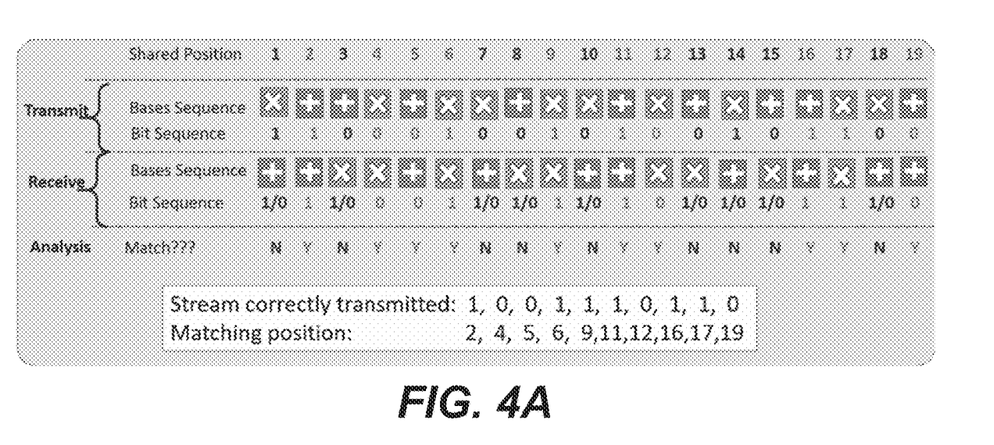
FIGS. 4A-4B are illustrations of quantum key distribution methods using binary and ternary data, respectively.

The BB84 protocol is illustrated in FIG. 4A. The transmitting party ("Alice") encodes information in the polarization of photons transmitted across a polarization-maintaining optical communications channel using one of two polarization bases. Both Alice and Bob may have optical communication interfaces having polarization control devices allowing them to generate photos have particular polarization and measure photons relative to one or more polarization orientations. Alice randomly chooses between two sets of basis states (e.g., the '+' basis or the 'x' basis). In an example, Alice can generate a photon (or stream of photons) using a first basis with two possible states: horizontal polarization and vertical polarization (this basis will be called the rectilinear basis, or '+.' Alice can also generate a photon in a basis that is rotated by 45° from the first basis (this basis will be called the diagonal basis or 'x'). In other words, the horizontal and vertical polarization axes in the second basis are rotated 45° respectively from the horizontal and vertical polarization axes of the rectilinear basis. The conversion between bit values and photon polarizations for this example is shown in Table I, below. Each bit is transmitted as one or more photons with a polarization axis defined by the choice of polarization basis ('+' or 'x') and the value of the bit. The photon polarizations for each bit pair are shown in the columns labeled "Rectilinear basis ('+')" and "Diagonal Basis ('x')". For example when the rectilinear basis is used, the bit value '0' is transmitted as photons polarized horizontally (denoted by →) and the bit value '1' is transmitted as photons polarized vertically (denoted by ↑). The diagonal basis is rotated 45° from the rectilinear basis. Thus, in the diagonal basis the bit value '0' is transmitted as photons polarized horizontally in the rotated basis (denoted by ↗) and the bit value '1' is transmitted as photons polarized vertically in the rotated basis (denoted by ↖).

TABLE I

| Bit Value | Rectilinear Basis ('+') | Diagonal Basis ('x') |
|---|---|---|
| 0 | → | ↗ |
| 1 | ↑ | ↖ |

The receiving party ("Bob") receives the photon(s) transmitted by Alice and also randomly chooses between the '+' and 'x' polarization bases to measure the polarization of the incoming photons. If Alice and Bob choose the same basis, Bob will measure the same values as Alice transmits. But if Alice and Bob's measurement bases are different, Bob will measure a random value (either '0' or '1') instead. If each bit is represented by N photons, Bob can detect the mismatch, because instead of detecting either 0 or N photons, Bob will detect approximately N/2 photons. Alice and Bob exchange information indicating their choices of polarization bases. Bob may then relay information to Alice indicating which of the transmitted bits Bob measured correctly. For example, as shown in FIG. 4A, Alice and Bob's polarization bases are aligned for the bits in the positions {2, 4, 5, 6, 9, 11, 12, 16, 17, and 19}. The bits in these positions may be assembled into the bitstream 1001110110. These bits, or a subset of them can be used as a shared key or otherwise used to derive a shared key as will be described further below. In practice, a much longer string of bits may be used to obtain a sufficiently-long key.

Figure 4B:
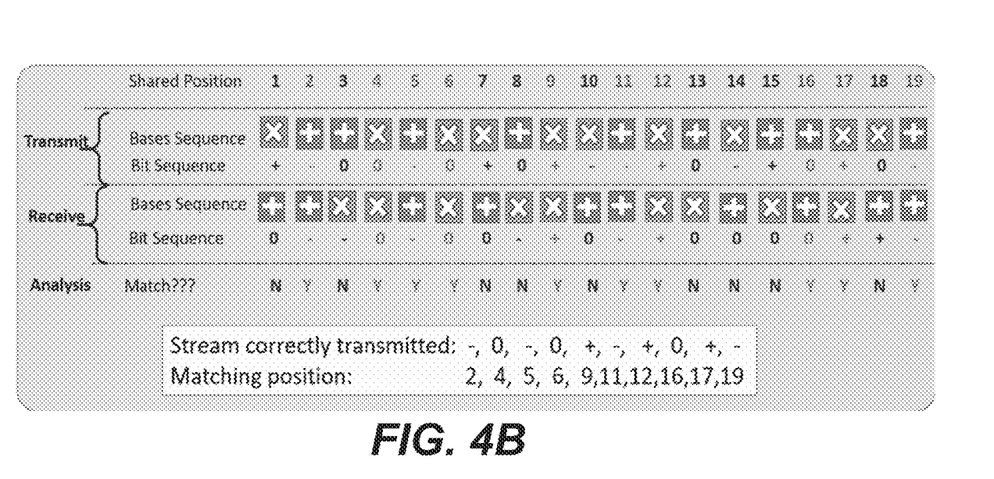

Since a photon may be polarized in any direction, the efficiency of quantum key distribution systems can be improved by the use of encoding systems that utilize more than just two possible polarization states in each basis. FIG. 4B illustrates a system that uses the same bases as BB84 described above. However, for each choice of polarization basis, there are now three possible polarization states. In the '+' basis, those states may be {0°, 45°, 90°} with respect to a reference axis, while in the 'x' basis, the states may be {45°, 90°, 135°}. The respective encodings for each possible trit value are shown below in Table II. The symbols {−, E, +} will be used to distinguish trit values from bit values. The density of information that can be transmitted through a quantum channel is higher with this ternary protocol. If M bits/μs are transmitted through the quantum channel, the rate information transmitted when there are two possible values is 2M bits/μs. However if M trits are transmitted instead, the transmitted information density becomes 3M bits/μs. If M=128, the data rate becomes $3.4 \times 10^{38}$ using binary states versus $1.8 \times 10^{61}$ using ternary states.

TABLE II

| Trit Value | Rectilinear Basis ('+') | Diagonal Basis ('x') |
|---|---|---|
| − | → | ↖ |
| E | ↗ | ↑ |
| + | ↑ | ↗ |

Similarly to existing QKD protocols, after Alice transmits a stream of photons representing values (now ternary values rather than binary), both Alice and share their random sequences which allows them to generate an agreed-upon ternary datastream which may be used to exchange, or derive, a shared encryption key. Only the trits transmitted with matching modes are kept in the sequence. Similarly to BB84, if an eavesdropper ("Eve") measures the photons sent from Alice to Bob, their polarization states will be disturbed.

Eve cannot successfully conduct a man-in-the-middle attack unless Eve knows Alice's choices of polarization states. Because at least one state is superposition of other states (i.e., the 45° state is an equal superposition of the horizontal and vertical states in the '+' basis), N photons are transmitted for each trit value and the receiver (using a polarizer oriented at 90°, for example) measures either 0, N/2, or N photons for each received trit value. Recall, that in the BB84 protocol, that if Bob (or Eve) measures N/2 photons that party can ascertain that their choice of polarization basis was incorrect. Interestingly, in the ternary protocol above, measuring N/2 photons is a valid result. Thus, an eavesdropper cannot determine whether they have successfully measured a transmitted trit (which could allow for a man-in-the-middle attack in implementations where it transmitting and receiving single photons for each value is impractical). As shown in FIG. 4B, Alice and Bob make the same polarization choices as in FIG. 4A, however, as explained above, Bob always measures a valid trit value. Thus, while Alice sends the stream
{+−E E−E+E+−−+E−+E+E−}
Bob receives the stream
{E−−E−E E−+E−+E E E E++−}.
Alice and Bob can then compare their choices of polarization bases and agree on the ternary stream
{−E−E+−+E+−}.

Table III below illustrates the outcomes discussed above for this communication scheme. The values in the "Trit value" column indicate the possible trit. The "Photon state" column indicates the photon polarization corresponding to each trit value for each of Alice's two possible polarization basis choices. For each photon state, there is one column for each of Bob's two possible choices of polarization axis (0° and 45°, i.e., '+' and 'x').

TABLE III

|  |  | Trit value | Photon state | Bob's Polarizer | |
|---|---|---|---|---|---|
|  |  |  |  | Bob Chooses 0° | Bob Chooses 45° |
| Alice's Polarizer | Alice Chooses 0° (+) | − | → | N | N/2 |
|  |  | E | ↗ | N/2 | N |
|  |  | + | ↑ | 0 | N/2 |
|  | Alice Chooses 45° (x) | − | ↖ | N/2 | N |
|  |  | E | ↑ | 0 | N/2 |
|  |  | + | ↗ | N/2 | 0 |

Figure 5:
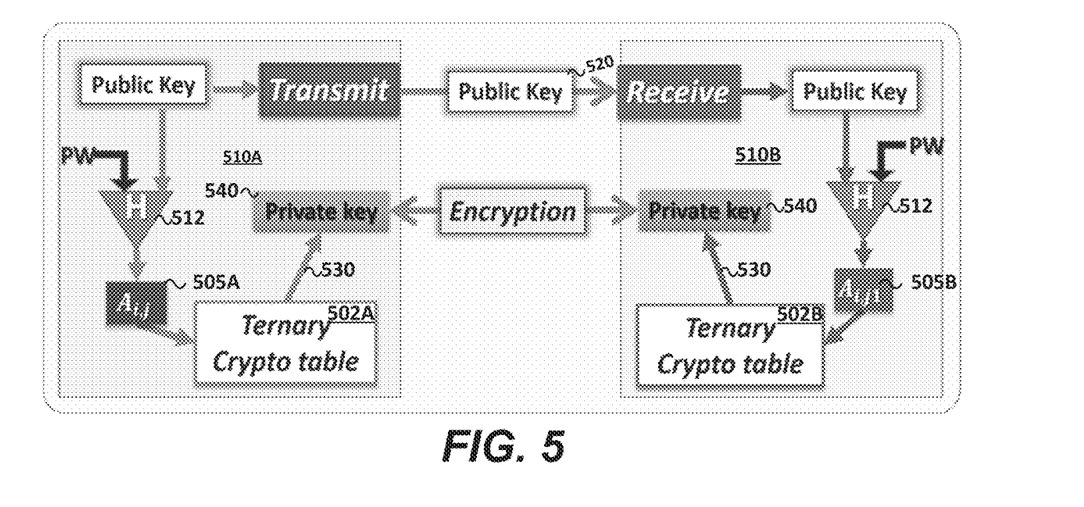
FIG. 5 depicts a block diagram illustrating two communication systems independently generating a shared encryption key by exchange of a public key from which the shared key may be derived.

FIG. 5 illustrates an environment in which two parties, "Alice" (510A) and "Bob" (510B) communicate in order to agree upon a shared key. "Alice" and "Bob" each have access to respective cryptographic tables 502A,B. In embodiments such as the embodiment shown, the cryptographic tables store ternary data. "Alice" may generate a public key 520 (or a datastream from which the public key 520 may be extracted) and transmit that public key 520 to Bob. Alice may use a quantum channel to transmit the public key 520 using a quantum key distribution technique such as one those described above. Alice and Bob can both use the public key 520 to access their respective cryptographic tables. In some embodiments, the public key 520 may be used to generate a message digest using a hash function 512. The output of the hash function 512 may be used as an address 505A,B (or range of address) that identifies a values stored in the respective cryptographic tables 502A,B. For added security the public key 520 may be combined with a password or other token. The password may be shared by the two parties, or each party may use a unique password. In embodiments where each party uses a unique password, the address spaces of each of the cryptographic tables 502A,B may be configured such that the combination of the same public key 520 with the password of each party indexes the same data.

The use of native ternary keys with native ternary algorithmic units can take advantage of the increased entropy (data density) ternary computing, thereby enhancing cybersecurity and information assurance between the communicating parties. The exchange of long keys using QKD can be time-consuming and latency requirements may limit the practical key lengths. Sufficiently longer keys can be exchanged using ternary states due to the higher information density (entropy) of sending trits instead of bits over a channel, as discussed above.

Considering that non-secure channel is used in this scheme, various encryption methods can be used to protect the transfer of information such as, but not limited to, DES, Triple DES, AES, or Blowfish. A safer method is to generate very long private keys for one-time use only and encrypt the messages with one-time pad (OTP) schemes. Additional protections such as multi-factor authentication of the communicating parties and the stack of hardware involved are also desirable.

Figure 6:
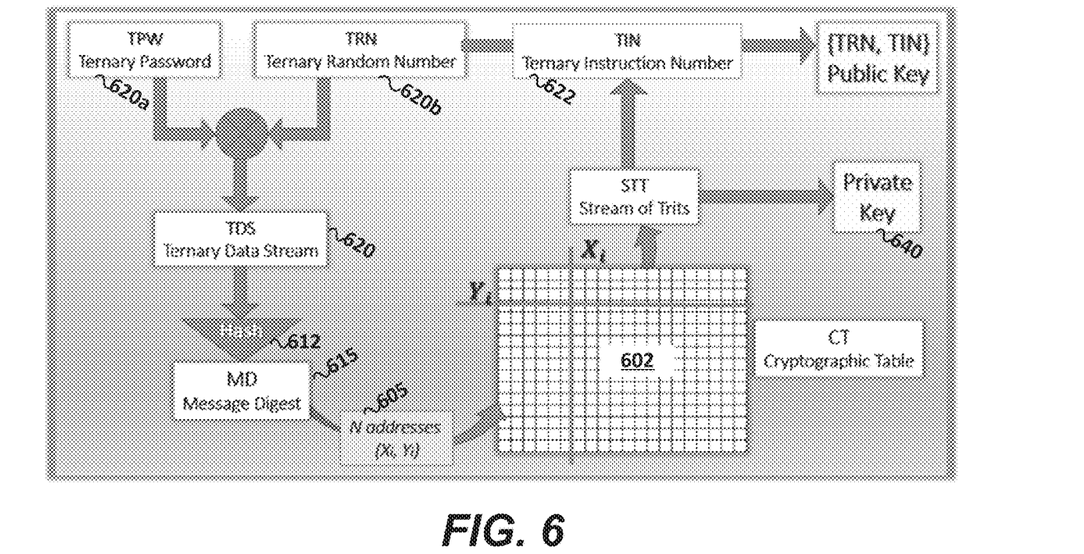
FIG. 6 is a block level flow diagram of a system for generating ternary private keys.

FIG. 6 illustrates a scheme where a device may both generate long private keys and employ additional authentication. The system pictured may represent either "Alice" or "Bob," as described above and further below. As pictured, data in a cryptographic table 602 accessible at addresses 605 are used to produce a stream of trits. The cryptographic table 602 may natively store ternary data or other data may be represented as ternary data. As discussed above, in some embodiments, the Bob may use a PUF array as a cryptographic table. In such embodiments Alice has a cryptographic table which stores characteristics of the Bob's PUF array sufficient to generate the same data as Bob. The PUF array may include ternary circuitry configured to natively return ternary values. As one nonlimiting example, the PUF array may be composed of ring oscillator circuits and the PUF array or attendant circuitry may be configured to produce a trit value that indicates whether one ring oscillator has a period that is longer or shorter than a second ring oscillator, or (approximately) equal to within a certain threshold. As another non-limiting example, a single ring oscillator may be used and the system may produce a trit indicating whether a given ring oscillator has a period in the in the first, second or third tertile of values for the ring oscillators of that array. In another non-limiting example, a PUF array may be comprised of SRAM cells, some of which may have non-deterministic bit values upon power-up. In such cases, cells which are always (or more than certain percentage of the time when cycled repeatedly) store a '1' upon being power-cycled may be assigned a first trit value (e.g. '+'), cells which always store a '0' may be assigned a second trit value (e.g., '−'), and trits whose values upon power cycling are between the two extremes may be assign a third trit value (e.g., 'E'). In embodiments where Bob uses a PUF array as the cryptographic table 602, Alice As shown, additional security can be introduced by combining a ternary password with a ternary random number in order to generate addresses in the cryptographic tables of "Alice" and "Bob." Alice may have ternary circuitry including a ternary random number generator that may natively generating ternary random number generators or a conventional random number generator that converts binary numbers or number sin other basis into ternary representations of those numbers. This combination can then be fed into any suitable cryptographic hash function. This has the feature of both preventing the password 620a (which may, as a non-limiting example be a password of a user or other authentication token) from being discovered and enabling a very long message digest to be produced given a suitable choice for the hash function 612. If the message digest 612 is much longer than a string of addresses need to produce a sufficiently long private key, the message digest 615 may be split into multiple segments or otherwise sampled to allow for multiple private keys to be generated from one "public key." In this instance one part may send an instruction to the other (e.g., the "ternary instruction number" 622). In embodiments such as the one shown in FIG. 6, the data retrieved from the cryptographic table may be partitioned to produce both values used to produce the private key and data used as instructions to produce the key. In some embodiments, the ternary instruction number may be used to identify a set of more detailed instructions stored in memory that will be used to generated the encryption key. In embodiments where a password is used, Alice and Bob may have separate passwords, in which case the "public key" would be the ternary random number 620b, and the address spaces of the respective cryptographic tables of "Alice" and "Bob" may be configured such that the combination of Alice's password and with the public key addresses the same data for Alice as does the combination of the public key with Bob's password for Bob.

When Bob uses a PUF as the cryptographic table 602 and Alice's cryptographic table 602 stores data characterizing Bob's PUF obtained during an enrollment process, the stream of trits Bob generates may not be perfectly deterministic given a particular address 605 (or set of addresses due to thermal effects, drift of device characteristics, or other error sources. In some such embodiments, Alice may transmit CRC, parity, checksum, or other suitable error-correction information enabling Bob to generate the same trits as Alice.

Figure 7:
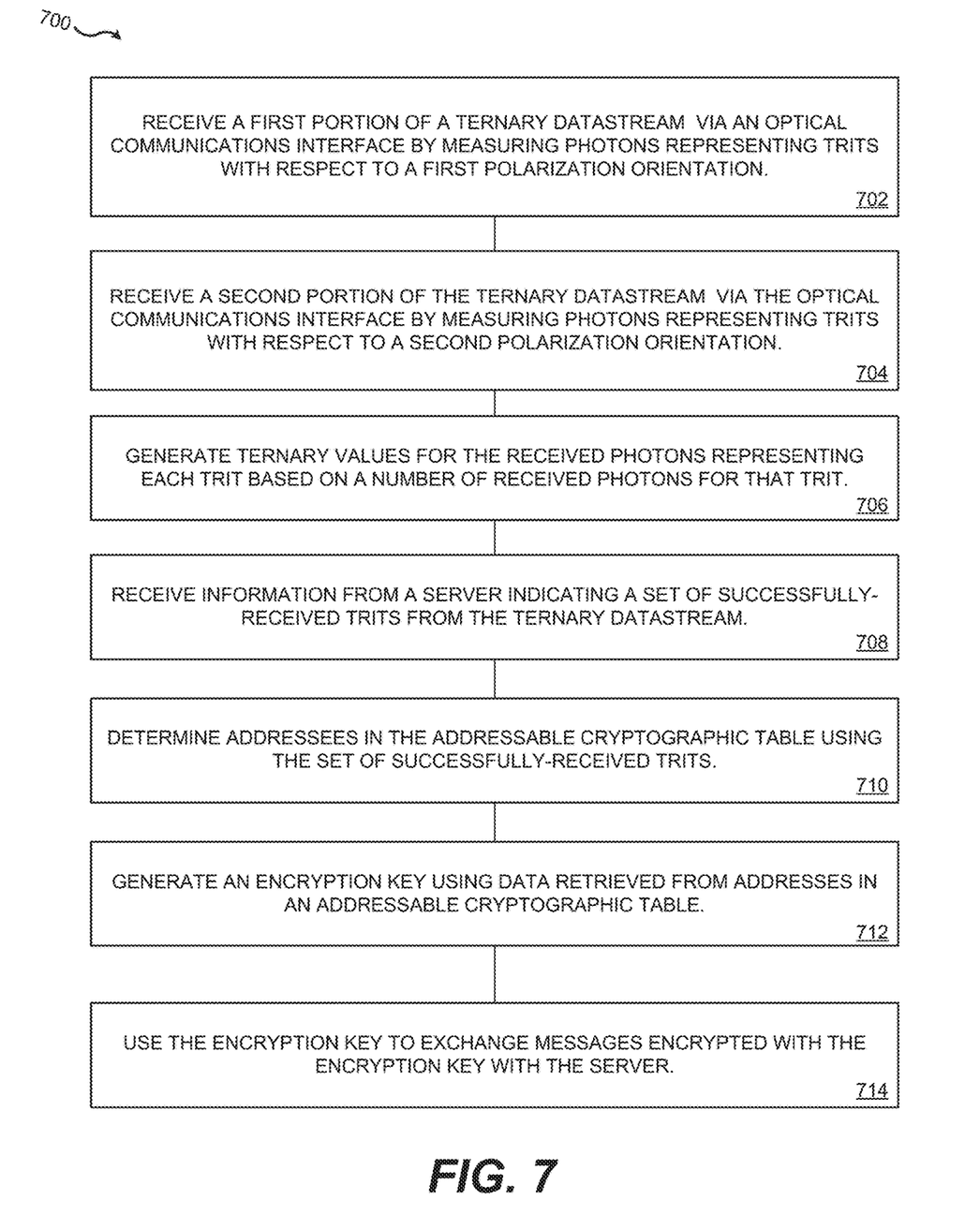
FIG. 7 is a flowchart illustrating an example method performed in embodiments disclosed herein.

FIG. 7 is a flowchart illustrating an example method 700 having steps 702, 704, 706, 708, 710, 712, and 714. This example method may be performed by a system such as the communication system 100B, acting as a client device in communication with a server such as the communication system 100A to generate a shared encryption key as described above. At step 702 the system may receive a first portion of a ternary datastream via an optical communication interface by measuring photons representing trits with respect to a first polarization orientation that defines first and second polarization axes that are mutually orthogonal to each other. At step 704 the system may receive a second portion of the ternary datastream via the optical communication interface by measuring photons representing trits with respect to a second polarization orientation that defines fourth and fifth polarization axes that are mutually orthogonal to each other. In some embodiments, the first and second portions of the datastream are interleaved and the system chooses a polarization orientation randomly or pseudo-randomly or according to an input datastream.

At step 706 the system may generate ternary values for the received photons representing each trit based on a number of received photons for that trit using a method such as that described above in connection with Table III. At step 708, the system may receive information from a server indicating a set of successfully-received trits from the ternary datastream. At step 710 the system may determine addressees in the addressable cryptographic table using the set of successfully-received trits. The set of successfully-received trits may be determined, at least in part, by sending information to a server identifying the polarization orientations chosen to measure the photons of each trit sent by the server as described above in connection to the BB84 protocol or other similar quantum key distributions protocols. The set of successfully-received trits may also be determined, at least in part, by receiving information from the server identifying the polarization orientations chosen to generate the photons of each trit and/or values of subset of those trits. At step 712 the system may generate an encryption key using data retrieved from the addresses in an addressable cryptographic table (e.g., the tables 502, 602; in some embodiments, the cryptographic table may be a PUF array such as the PUF array 202 as described above). In some embodiments, a server such as the communication system 100A may independently generate the same encryption key as described above. Finally, at step 714 the system may use the encryption key to exchange messages encrypted with the encryption key with the server over any suitable communication channel, which may include a conventional wired channel, a wireless channel or others, including communication networks comprising any suitable combination of communication channels such as a WAN, LAN, or the Internet, as non-limiting examples.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

The invention claimed is:

1. A system, comprising:
   a server having:
      a server processor including ternary circuitry configured to generate and receive ternary signals and perform ternary logic operations on the ternary signals;
      a first optical communication interface coupled to the server processor and having a polarization control device and configured to couple to an optical communication channel;
      first memory storing an addressable cryptographic table storing ternary strings and first executable instructions that when executed by the processor cause the server to:
         generate a ternary datastream using the ternary circuitry;
         transmit a first portion of the ternary datastream via the first optical communication interface of the server using a first polarization orientation that defines first and second polarization axes that are mutually orthogonal to each other by generating polarized photons according to ternary digits ("trit") of the first portion of ternary datastream such that the polarized photons for each trit are polarized:

along the first polarization axis when that trit has a first ternary value;

along the second polarization axis when that trit has a second ternary value;

along a third polarization axis that is an equally-weighted vector combination of the first and second polarization axes when that trit has a third ternary value;

transmit a second portion of the ternary datastream using a second polarization orientation that defines fourth and fifth polarization axes that are mutually orthogonal to each other by generating polarized photons representing trits of the second portion of the ternary datastream such that the polarized photons for each trit are polarized along one of the following polarization axes according to a ternary value of that trit:

the fourth polarization axis, the fifth polarization axis, and a sixth polarization axis;

wherein the fourth and fifth polarization axes are equally-weighted vector combinations of the first and second polarization axes; and wherein the sixth polarization axis is an equally-weighted vector combination of the fourth and fifth polarization axes and also parallel to one of the first and second polarization axis;

select successfully-received trits from the ternary datastream according to selection instructions stored in the memory;

determine addresses in the addressable cryptographic table of the server using the selected successfully-received trits;

generate an encryption key using data retrieved from the addresses in the addressable cryptographic table of the server; and use the encryption key to encrypt and decrypt communications between the server device and the receiving device;

and a client device having:

a client processor including client ternary circuitry configured to generate and receive ternary signals and perform ternary logic operations on ternary signals;

a second optical communication interface having a polarization control device coupled to the client processor and configured to couple to the optical communication channel;

an addressable cryptographic table configured to produce ternary strings when queried; and second memory storing second executable instructions that when executed by the client processor cause the client device to:

receive a third portion of the ternary datastream by measuring photons received via the second optical communication interface of the client device with respect to the first polarization orientation;

receive a fourth portion of the ternary datastream by measuring photons received via the second optical communication interface of the client device with respect to the second polarization orientation assign ternary values for the received photons for each trit such that each trit is assigned:

the first ternary value when the number of received photons is larger than a first number of photons;

the second ternary value when the number of received photons is smaller than a second number of photons; and the third ternary value when the number of received photons is less than the first number of photons and greater than the second number of photons;

transmit the reception information to the server;

select successfully-received trits from the ternary datastream according to selection instructions received from the server;

determine addresses in the addressable cryptographic table of the client device using the selected successfully-received trits;

generate the encryption key using data retrieved from the addresses in the addressable cryptographic table; and use the encryption key to encrypt and decrypt communications between the client device and the server.

2. The system of claim 1, wherein the addressable cryptographic table of the client device is a PUF array having a plurality of PUF devices;

wherein generating encryption key using the data retrieved from the addresses in the addressable cryptographic table of the client device comprises measuring physical characteristics of PUF devices belonging the PUF array of the client device;

wherein the addressable cryptographic table of the server stores data representing measured device characteristics of the PUF devices belong to the PUF array of the client device; and wherein generating the encryption key using the data retrieved from the addresses in the addressable cryptographic table of server comprises retrieving data representing the measured physical characteristics of the PUF devices belonging the PUF array of the client device.

3. The system of claim 2, wherein measuring physical characteristics of the PUF devices belonging to the PUF array of the client device comprises: measuring pairs of PUF devices belonging to the PUF array of the client device and comparing measured values of characteristics of that pair of PUF devices to produce a trit having a ternary value indicating whether a difference in measured characteristics of each pair of PUF devices is greater than first threshold, smaller than a second threshold, or between the first and the second threshold.

4. The system of claim 2, wherein the PUF devices of the PUF array of the client device wherein measuring physical characteristics of the PUF devices belonging to the PUF array of the client device comprises: repeatedly measuring binary values produced by the PUF devices belonging to the PUF array of the client device and producing a trit for each PUF device based on a proportion of measurements of that PUF device producing a predetermined binary value.

5. The system of claim 1, wherein the second memory includes further instructions that, when executed, causes the client processor to:

select additional successfully-received trits from the ternary datastream according to additional selection instructions received from the server;

determine additional addresses in the addressable cryptographic table of the client device using the additional selected successfully-received trits; and generate one or more additional encryption keys using data retrieved from the additional addresses in the addressable cryptographic table of the client device; and in response to receiving the additional selection instructions, exchange messages encrypted with the one or more additional encryption keys with the server.

6. The system of claim 1, wherein determining the addresses in the addressable cryptographic table of the server using the selected successfully-received trits comprises applying a cryptographic hash function to a combination of the selected successfully-received trits and a password unique to the server.

7. The system of claim 6, wherein determining the addresses in the addressable cryptographic table of the client device using the selected successfully-received trits comprises applying a cryptographic hash function to a combination of the selected successfully-received trits and a password unique to the client device.

8. A system, comprising:
a processor including ternary circuitry configured to generate and receive ternary signals and perform ternary logic operations on ternary signals;
an optical communication interface coupled to the processor having a polarization control device and configured to couple to an optical communication channel, the polarization control device configurable to measure received photons in one of two polarization orientation:
a first polarization orientation that defines first and second polarization axes that are mutually orthogonal to each other; and
a second polarization orientation that defines third and fourth polarization axes that are mutually orthogonal to each other, the third and fourth polarization axes each an being equally-weighted vector combination of the first and second polarization axes;
an addressable cryptographic table configured to produce ternary strings when addresses of the cryptographic table are queried;
memory storing executable instructions that when executed by the processor cause the system to:
receive a first portion of a ternary datastream by measuring photons received via the optical communication interface with respect to the first polarization orientation;
receive a second portion of the ternary datastream by measuring photons received via the optical communication interface with respect to the second polarization orientation;
assign ternary values for the received photons for each trit such that each trit is assigned:
a first ternary value when the number of received photons is larger than a first number of photons;
a second ternary value when the number of received photons is smaller than a second number of photons; and
a third ternary value when the number of received photons is less than the first number of photons and greater than the second number of photons;
receive information indicating a set of successfully-received trits from the ternary datastream;
determine addressees in the addressable cryptographic table using the set of successfully-received trits;
generate an encryption key using data retrieved from the addresses in the addressable cryptographic table; and
use the encryption key to exchange messages encrypted with the encryption key with a server.

9. The system of claim 8,
wherein the addressable cryptographic table is a physical unclonable function ("PUF") array having a plurality of PUF devices;
wherein generating the encryption key using the data retrieved from the addresses in the addressable cryptographic table comprises measuring physical characteristics of PUF devices belonging the PUF array.

10. The system of claim 9,
wherein measuring physical characteristics of the PUF devices belonging to the PUF array comprises: measuring pairs of PUF devices belonging to the PUF array and comparing measured values of characteristics of that pair of PUF devices to produce a trit having a ternary value indicating whether a difference in the measured values of the characteristics of each pair of PUF devices is greater than a first threshold, smaller than a second threshold, or between the first and the second threshold.

11. The system of claim 9, wherein measuring physical characteristics of the PUF devices belonging to the PUF array comprises:
repeatedly measuring binary values produced by the PUF devices belonging to the PUF array and producing a trit for each PUF device based on a proportion of measurements of that PUF device producing a predetermined binary value.

12. The system of claim 8, wherein the second memory includes further instructions that, when executed, causes the system to:
select additional successfully-received trits from the ternary datastream according to additional selection instructions;
determine additional addresses in the addressable cryptographic table using the additional selected successfully-received trits; and
generate one or more additional encryption keys using data retrieved from the additional addresses in the addressable cryptographic table; and
in response to receiving the additional selection instructions, exchange messages encrypted with the one or more additional encryption keys with the server.

13. The system of claim 8, wherein generating the encryption key using the data retrieved from the addresses in the addressable cryptographic table comprises extracting key generation instructions from a stream of trits received from the addressable cryptographic table and using those instructions to generate the encryption key.

14. A method, comprising:
receiving, using a computing device having an addressable cryptographic table and an optical communication interface that includes a polarization control device:
a first portion of a ternary datastream via an optical communication by measuring photons representing trits received interface with respect to a first polarization orientation defining first and second polarization axes that are mutually orthogonal to each other; and;
a second portion of the ternary datastream via the optical communication interface by measuring photons representing trits with respect to a second polarization orientation defining third and fourth polarization axes each being an equally-weighted vector combination of the first and second polarization axes;

generating ternary values for the received photons representing each trit such that each trit is assigned:
   a first ternary value when the number of received photons is larger than a first number of photons;
   a second ternary value when the number of received photons is smaller than a second number of photons; and
   a third ternary value when the number of received photons is less than the first number of photons and greater than the second number of photons;

receiving information indicating a set of successfully-received trits of the ternary datastream;

determining addressees in the addressable cryptographic table using the set of successfully-received trits;

generating an encryption key using data retrieved from the addresses in the addressable cryptographic table; and using the encryption key to exchange messages encrypted with the encryption key with a server.

15. The method of claim 14, wherein generating the encryption key using the data retrieved from the addresses in the addressable cryptographic table comprises measuring physical characteristics of physical unclonable function ("PUF") devices belonging to a PUF array of the computing device.

16. The method of claim 15, wherein measuring physical characteristics of the PUF devices belonging to the PUF array comprises:
   measuring pairs of PUF devices belonging to the PUF array and comparing measured values of characteristics of that pair of PUF devices to produce a trit having a ternary value indicating whether a difference in the measured values of the characteristics of each pair of PUF devices is greater than a first threshold, smaller than a second threshold, or between the first and the second threshold.

17. The method of claim 15, wherein measuring physical characteristics of the PUF devices belonging to the PUF array comprises:
   repeatedly measuring binary values produced by the PUF devices belonging to the PUF array and producing a trit for each PUF device based on a proportion of measurements of that PUF device producing a predetermined binary value.

18. The method of claim 15, wherein generating the encryption key using the data retrieved from the addresses in the addressable cryptographic table comprises:
   receiving error correction instruction from the server; and
   applying the error-correction instructions to the data retrieved from the addressable cryptographic table to produce corrected data; and
   deriving the encryption key from the corrected data.

19. The method of claim 14, the method further comprising:
   selecting additional sets of successfully-received trits from the ternary datastream according to additional selection instructions received from the server;
   determining additional addresses in the addressable cryptographic table using the additional sets of selected successfully-received trits; and
   generating one or more additional encryption keys using data retrieved from the additional addresses in the addressable cryptographic table; and
   in response to receiving the additional selection instructions, exchanging messages encrypted with the one or more additional encryption keys with the server.

20. The method of claim 14, wherein generating the encryption key using the data retrieved from the addresses in the addressable cryptographic table comprises extracting key generation instructions from a stream of trits received from the addressable cryptographic table and using those instructions to generate the encryption key.

\* \* \* \* \*